United States Patent
Chiba et al.

(10) Patent No.: US 10,633,504 B2
(45) Date of Patent: Apr. 28, 2020

(54) EXPANDED POLYLACTIC ACID RESIN BEADS AND MOLDED ARTICLE OF EXPANDED POLYLACTIC ACID RESIN BEADS

(71) Applicant: JSP Corporation, Tokyo (JP)

(72) Inventors: Takuya Chiba, Yokkaichi (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 76 days.

(21) Appl. No.: 15/223,837

(22) Filed: Jul. 29, 2016

(65) Prior Publication Data
US 2017/0029591 A1 Feb. 2, 2017

(30) Foreign Application Priority Data
Jul. 30, 2015 (JP) ................................. 2015-151303

(51) Int. Cl.
| | | |
|---|---|---|
| *C08J 9/232* | (2006.01) | |
| *C08J 9/12* | (2006.01) | |
| *C08J 9/18* | (2006.01) | |
| *C08L 67/04* | (2006.01) | |
| *B32B 5/18* | (2006.01) | |
| *C08J 9/00* | (2006.01) | |
| *C09D 167/04* | (2006.01) | |
| *B29C 43/00* | (2006.01) | |
| *B29C 44/34* | (2006.01) | |
| *B29K 67/00* | (2006.01) | |
| *B29K 105/04* | (2006.01) | |

(52) U.S. Cl.
CPC ............. *C08J 9/232* (2013.01); *B29C 43/003* (2013.01); *B29C 44/3461* (2013.01); *B32B 5/18* (2013.01); *C08J 9/0061* (2013.01); *C08J 9/122* (2013.01); *C08J 9/18* (2013.01); *C08L 67/04* (2013.01); *C09D 167/04* (2013.01); *B29K 2067/046* (2013.01); *B29K 2105/048* (2013.01); *C08J 2201/03* (2013.01); *C08J 2201/034* (2013.01); *C08J 2203/06* (2013.01); *C08J 2205/044* (2013.01); *C08J 2205/052* (2013.01); *C08J 2205/10* (2013.01); *C08J 2207/00* (2013.01); *C08J 2300/16* (2013.01); *C08J 2367/04* (2013.01); *C08J 2400/16* (2013.01); *C08J 2423/04* (2013.01); *C08J 2423/06* (2013.01); *C08J 2423/10* (2013.01); *C08J 2467/04* (2013.01)

(58) Field of Classification Search
CPC ....................................................... C08J 9/232
See application file for complete search history.

(56) References Cited

U.S. PATENT DOCUMENTS

| | | | | |
|---|---|---|---|---|
| 2002/0048673 | A1* | 4/2002 | Yokoyama | ................ B32B 5/20 428/319.9 |
| 2007/0255013 | A1* | 11/2007 | Becraft | .................... C08L 67/04 525/418 |
| 2010/0261000 | A1* | 10/2010 | Jones | ................... B29C 44/1228 428/313.5 |
| 2013/0059154 | A1* | 3/2013 | Shinohara | ................. C08J 9/122 428/402.24 |
| 2013/0288056 | A1 | 10/2013 | Shinohara et al. | |
| 2014/0097389 | A1* | 4/2014 | Chiba | ...................... H01B 1/24 252/211 |
| 2014/0336289 | A1 | 11/2014 | Shinohara et al. | |

FOREIGN PATENT DOCUMENTS

| | | |
|---|---|---|
| EP | 2573133 A1 | 3/2013 |
| EP | 2940070 A1 | 11/2015 |
| JP | 2011-132274 A | 7/2011 |
| JP | 2013-014681 A | 1/2013 |
| JP | 2014-193539 A | 10/2014 |
| WO | 2011/145391 A1 | 11/2011 |
| WO | 2012/086305 A1 | 6/2012 |
| WO | 2013/058056 A1 | 4/2013 |

OTHER PUBLICATIONS

Natureworks Ingeo Resin, 2017.*
Extended European Search Report issued in corresponding European Application No. 16180360 dated Sep. 14, 2016 (8 Pages).
Office Action dated Feb. 12, 2019, in corresponding Japanese Patent Application No. 2015-151303.

* cited by examiner

*Primary Examiner* — Irina Krylova
(74) *Attorney, Agent, or Firm* — Fitch, Even, Tabin & Flannery LLP (57) ABSTRACT

The present invention provides expanded polylactic acid resin beads, in which each bead is composed of a core layer that is in an expanded state and contains a crystalline polylactic acid resin, and a coating layer that coats the core layer and contains a mixed resin of an amorphous polylactic acid resin and a crystalline polyolefin resin, wherein the content of the crystalline polyolefin resin in the coating layer is 3% by weight or more and less than 50% by weight. The expanded polylactic acid resin beads can stably produce a molded article of expanded polylactic acid resin beads excellent in fusibility of the expanded polylactic acid resin beads therein and also excellent in solvent resistance.

8 Claims, 3 Drawing Sheets

EXPANDED POLYLACTIC ACID RESIN BEADS AND MOLDED ARTICLE OF EXPANDED POLYLACTIC ACID RESIN BEADS

CROSS-REFERENCE TO RELATED APPLICATIONS

This application claims priority to Japanese Application No. 2015-151303, filed Jul. 30, 2015, the complete disclosure of which is incorporated by reference in its entirety.

FIELD OF THE INVENTION

The present invention relates to expanded polylactic acid resin beads favorable for in-mold molding, and to an in-mold molded article formed with the expanded beads.

BACKGROUND OF THE INVENTION

Recently, according to the consideration to global environment, polylactic acid, which is an ecological plant-derived general-purpose expandable resin, has attracted attention as a carbon-neutral material which takes the place of conventional general-purpose resins produced by petroleum resources. A molded article of expanded polylactic acid resin beads can be obtained as an in-mold molded article having a desired shape without being subject to any shape-related restrictions, like conventional molded articles of expanded polystyrene beads and molded articles of expanded polyolefin beads. In addition, in accordance with the intended object thereof, for example, for lightweightness, buffer performance, heat insulation performance and the like, design of properties is easily performed, and therefore the mold article is a promising material.

From the viewpoint of the heat resistance and the mechanical properties of polylactic acid resin molded articles, a crystalline polylactic acid resin is mainly used as the base resin of expanded polylactic acid resin beads for in-mold molding. However, expanded beads of a crystalline polylactic acid resin are difficult to fuse together during in-mold molding, as compared with expanded polystyrene resin beads and the like, and thus have a problem in point of fusibility thereof.

As a technique of improving the fusibility of expanded beads of a crystalline polylactic acid resin, for example, PTL 1 discloses expanded polylactic acid resin beads, in which each bead is composed of a core layer formed of a polylactic acid resin and an outer layer positioned on the surface side relative to the core layer, and the outer layer is formed of a polylactic acid resin. According to this technique, not only the whole expanded beads have a specific endothermic calorific value, but also the endothermic calorific value in the surface layer part of the expanded bead and the endothermic calorific value in the center part of the expanded bead satisfy a specific relationship, and therefore, the fusibility of the expanded beads can be enhanced.

On the other hand, depending on the use thereof, for example, in the case where a molded article of expanded polylactic acid resin beads is used as a core material or the like in a molded article of a FRP (fiber reinforced plastic) composite, the molded article of expanded beads may be exposed to a solvent such as styrene or the like contained in a thermosetting resin composition. At that time, when the solvent resistance of the molded article of expanded beads is insufficient, the expanded beads would separate owing to solvent penetration into the article, whereby the shape of the molded article of expanded beads could not be maintained, and therefore, a molded article of expanded beads having solvent resistance is desired in some cases. However, PTL 1 has no disclosure relating to a technique of imparting solvent resistance to multilayer expanded polylactic acid resin beads, especially in the case where an amorphous polylactic acid resin is used as the outer layer of the expanded beads, and there still remains room to study in the technique.

PTL 1: WO2011/145391

DISCLOSURE OF THE INVENTION

An object of the present invention is to provide expanded polylactic acid resin beads excellent in fusibility of the beads to each other and capable of stably producing a molded article of expanded polylactic acid resin beads excellent in solvent resistance.

The present inventors have assiduously studied for solving the above-mentioned problems and, as a result, have found, as the most effective means for solution to problem, expanded polylactic acid resin beads in which each bead is composed of a core layer that is in an expanded state and contains a crystalline polylactic acid resin, and a coating layer that coats the core layer and contains a mixed resin of an amorphous polylactic acid resin and a crystalline polyolefin resin and in which the content of the crystalline polyolefin resin in the coating layer is 3% by weight or more and less than 50% by weight, and thereby have completed the present invention.

Specifically, according to the present invention, there are provided expanded polylactic acid resin beads and a molded article of expanded polylactic acid resin beads as described below.

(1) Expanded polylactic acid resin beads, wherein the expanded bead is composed of a core layer that is in an expanded state and contains a crystalline polylactic acid resin, and a coating layer that coats the core layer and contains a mixed resin of an amorphous polylactic acid resin and a crystalline polyolefin resin, and the content of the crystalline polyolefin resin in the coating layer is 3% by weight or more and less than 50% by weight.

(2) The expanded polylactic acid resin beads according to (1), wherein the melting point of the crystalline polyolefin resin is lower than the melting point of the crystalline polylactic acid resin by 20° C. or more.

(3) A molded article of expanded polylactic acid resin beads, which is produced by molding the expanded polylactic acid resin beads according to (1) or (2) in a mold cavity.

(4) The molded article of expanded polylactic acid resin beads according to (3), wherein the bulk density of the molded article of expanded polylactic acid resin beads is 15 to 300 kg/m$^3$, and the ratio of a bending strength (kPa) of the molded article of expanded polylactic acid resin beads to the bulk density (kg/m$^3$) thereof (bending strength/bulk density) is 13 or more (kPa·m$^3$/kg).

(5) The molded article of expanded polylactic acid resin beads according to (3) or (4), which is to be used for an FRP composite molded article.

PREFERRED EMBODIMENTS OF CARRYING OUT THE INVENTION

The expanded polylactic acid resin beads of the present invention are described in detail hereinunder.

Each of the expanded polylactic acid resin beads of the present invention (hereinafter also referred to as "expanded beads" in a simplified manner) is composed of a core layer that is in an expanded state and contains a crystalline polylactic acid resin and a coating layer that coats the core layer and contains a mixed resin of an amorphous polylactic acid resin and a crystalline polyolefin resin mixed in a specific ratio.

(Polylactic Acid Resin Constituting Core Layer and Coating Layer)

In the present invention, the polylactic acid resin contained in the core layer and the coating layer is formed of a polylactic acid or a mixture of a polylactic acid and any other resin. The polylactic acid is preferably a polymer containing a lactic acid-derived component unit in an amount of 50 mol % or more.

Examples of the polylactic acid include (a) a polymer of lactic acid, (b) a copolymer of lactic acid and any other aliphatic hydroxycarboxylic acid, (c) a copolymer of lactic acid, an aliphatic polyalcohol and an aliphatic polycarboxylic acid, (d) a copolymer of lactic acid and an aliphatic polycarboxylic acid, (e) a copolymer of lactic acid and an aliphatic polyalcohol, (f) a mixture of any of these (a) to (e), etc. The polylactic acid may also include those called a stereocomplex polylactic acid or a stereoblock polylactic acid. Specific examples of lactic acid include L-lactic acid, D-lactic acid, DL-lactic acid; as a cyclic dimer thereof, L-lactide, D-lactide, and DL-lactide; and a mixture of these.

Examples of the other aliphatic hydroxycarboxylic acid in the above (b) include glycolic acid, hydroxybutyric acid, hydroxyvaleric acid, hydroxycaproic acid, hydroxyheptanoic acid, etc.

Examples of the aliphatic polyalcohol in the above (c) or (e) include ethylene glycol, 1,4-butanediol, 1,6-hexanediol, 1,4-cyclohexanedimethanol, neopentyl glycol, decamethylene glycol, glycerin, trimethylolpropane, pentaerythritol, etc.

Examples of the aliphatic polycarboxylic acid in the above (c) and (d) include succinic acid, adipic acid, suberic acid, sebacic acid, dodecanedicarboxylic acid, succinic anhydride, adipic anhydride, trimesic acid, propanetricarboxylic acid, pyromellitic acid, pyromellitic anhydride, etc.

(Terminal Blocking of Polylactic Acid Constituting Expanded Core Layer and Coating Layer)

In the polylactic acid for use in the present invention, preferably, the functional group at the terminal of the molecular chain is blocked. With that, hydrolysis in the production process for expanded polylactic acid resin beads can be more surely prevented, and the above-mentioned expanded polylactic acid resin beads endurable to in-mold molding can be obtained easily.

Further, the durability of the molded article of expanded polylactic acid resin beads (hereinafter also referred to as "molded article of expanded beads" or "molded article" in a simplified manner) obtained by in-mold molding is improved.

Examples of the terminal blocking agent to be used for blocking the terminal of the molecular chain include carbodiimide compounds, oxazoline compounds, isocyanate compounds, epoxy compounds, etc.

Among these, carbodiimide compounds are preferred. Specifically, there are mentioned aromatic monocarbodiimides such as bis(dipropylphenyl)carbodiimide (for example, Stabaxol 1-LF manufactured by Rhein Chemie Corporation), etc.; aromatic polycarbodiimides (for example, Stabaxol P400 manufactured by Rhein Chemie Corporation), aliphatic polycarbodiimides such as poly(4,4'-dicyclohexylmethanecarbodiimide) (for example, Carbodilite LA-1 manufactured by Nisshinbo Chemical Inc.), etc. One alone or two or more of these terminal blocking agents may be used either singly or as combined.

The amount of the terminal blocking agent to be incorporated is preferably 0.1 to 5 parts by weight relative to 100 parts by weight of polylactic acid, more preferably 0.5 to 3 parts by weight.

To that effect, the polylactic acid for use in the present invention is preferably a modified polylactic acid resin modified with one or more terminal blocking agents selected from carbodiimide compounds, epoxy compounds, isocyanate compounds, etc., more preferably a modified polylactic acid modified with a carbodiimide compound.

(Core Layer)

In the present invention, the core layer of the expanded beads contains a crystalline polylactic acid resin. The crystalline polylactic acid resin in the present invention is such that the endothermic calorific value (Br; endo) to be measured after heat treatment according to the following measurement method is preferably 20 J/g or more, more preferably 25 J/g or more. The upper limit of the endothermic calorific value (Br; endo) is approximately 70 J/g, preferably 60 J/g.

The crystalline polylactic acid resin includes those formed of a crystalline polylactic acid alone and those formed of a polylactic acid mixture of a crystalline polylactic acid and an amorphous polylactic acid.

Since the core layer of the expanded beads contain a crystalline polylactic acid resin, a molded article excellent in heat resistance and mechanical properties can be obtained by in-mold molding.

(Method for Measuring Endothermic Calorific Value of Crystalline Polylactic Acid Resin Constituting Core Layer)

The measurement of the above-mentioned endothermic calorific value (Br; endo) may be carried out through heat flux differential scanning calorimetry described in JIS K7122-1987. Specifically, first, 1 to 4 mg of a polylactic acid resin for measurement of endothermic calorific value is melted by heating up to a temperature higher by 30° C. than the melting peak end temperature, kept at that temperature for 10 minutes, then cooled down to 110° C. at a cooling rate of 2° C./min, kept at that temperature for 120 minutes, and further cooled down to 40° C. at a cooling rate of 2° C./min. After the heat treatment, the polylactic acid resin is melted by again heating up to a temperature higher by 30° C. than the melting peak end temperature at a heating rate of 2° C./min. The value obtained on the basis of the DSC curve obtained at that time (hereinafter also referred to as "second-time DSC curve (II)") is referred to as the endothermic calorific value (Br: endo). One exemplification of the second-time DSC curve (II) is shown in FIG. 1.

Figure 1:
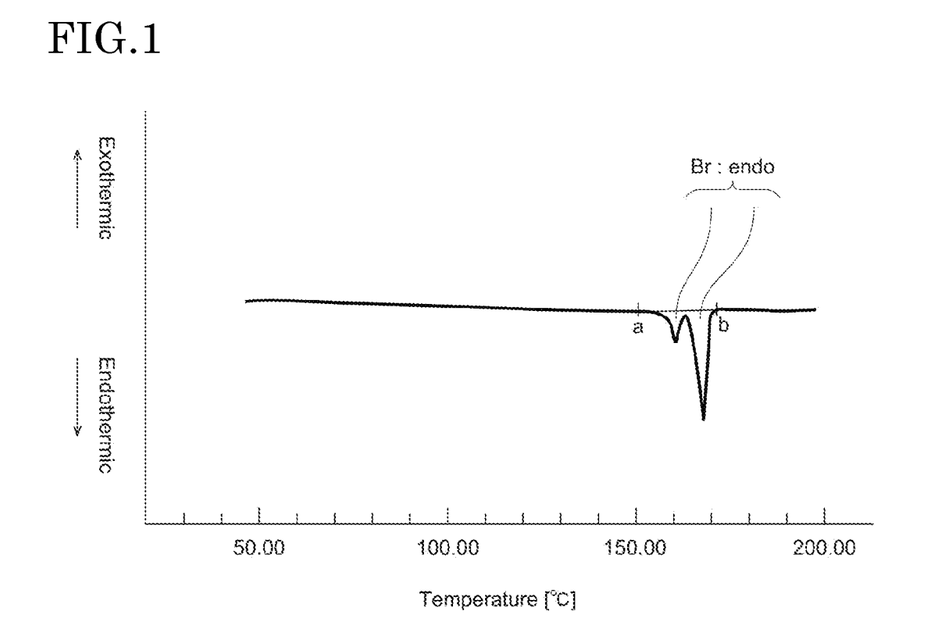
FIG. 1 exemplifies a second-time DSC curve (II) showing the endothermic calorific value (Br: endo) of a polylactic acid resin obtained through heat flux differential scanning calorimetry FIG. 2 exemplifies a second-time DSC curve (II) showing the endothermic calorific value (Br: endo) of a polylactic acid resin obtained through heat flux differential scanning calorimetry
Figure 2:
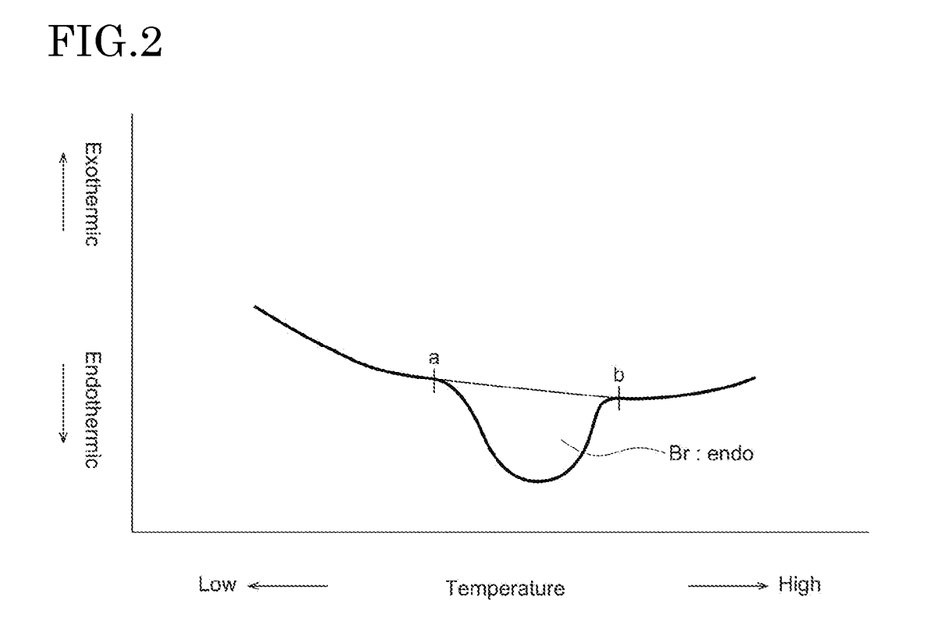

The endothermic calorific value (Br: endo) is, as shown in FIG. 1, the value to be obtained from the area surrounded by the straight line connecting the point "a" and the point "b" and the DSC curve, where the point "a" is a point at which the melting peak separates from the base line on the low-temperature side of the melting peak of the second-time DSC curve (II), and the point "b" is a point at which the melting peak returns to the base line on the high-temperature side. The measurement device is so controlled that the base line could be as straight as possible. In addition, as shown in FIG. 2, in the case where the base line is curved, a point at which the melting peak separates from the curved base line on the low-temperature side when the curved base line on the low-temperature side of the melting peak is extended toward the high-temperature side while the curved state of the curve is kept as such is referred to as the point "a", and a point at which the melting peak returns back to the curved high-temperature side base line when the curved base line on the high-temperature side of the melting peak is extended toward the low temperature side while the curved state of the curve is kept as such is referred to the point "b".

The reason why the condition of keeping the sample at 110° C. for 120 minutes, the cooling rate of 2° C./min and the heating rate of 2° C./min are employed as the measurement condition for the DSC curve of the sample is for determining the endothermic calorific value (Br: endo) under the condition where the crystallization of the polylactic acid resin has been allowed to proceed as much as possible.

(Other Resins Capable of Being Mixed in Core Layer)

In the core layer of the expanded beads, any other resins except the polylactic acid resin may be incorporated, within a range not detracting from the object and the effect of the present invention.

The content of the other resins in the core layer is preferably 20% by weight or less relative to the total amount, 100% by weight of the resins constituting the core layer, more preferably 10% by weight or less, even more preferably 0% by weight.

The other resins include polyethylene resins, polypropylene resins, polystyrene resins, polyester resins except polylactic acid resin, etc. Above all, from the viewpoint of environmental load reduction, a biodegradable aliphatic polyester resin containing at least 35 mol % of an aliphatic ester component unit is preferred.

(Coating Layer, Amorphous Polylactic Acid Resin)

In the present invention, the coating layer of the expanded beads contains a mixed resin of an amorphous polylactic acid resin and a crystalline polyolefin resin. Here, the amorphous polylactic acid resin in the present invention substantially doesn't have a melting peak in the DSC curve (II) obtained through measurement of the endothermic calorific value (Br; endo) of the above-mentioned polylactic acid resin. A concrete endothermic calorific value in the case of "substantially doesn't have a melting peak" is around 5 J/g or less, preferably 3 J/g or less, more preferably 0 J/g.

As the coating layer contains an amorphous polylactic acid resin, the expanded resin beads can exhibit excellent fusibility in in-mold molding.

(Coating Layer, Crystalline Polyolefin Resin)

Examples of the crystalline polyolefin resin contained in the mixed resin include a polypropylene resin such as a propylene homopolymer, an ethylene-propylene copolymer, etc.; a polyethylene resin such as a high-density polyethylene, a linear low-density polyethylene, a low-density polyethylene, an ethylene-vinyl acetate copolymer, etc. Further, it is desirable that the melting point of the crystalline polyolefin resin is lower than the melting point of the crystalline polylactic acid resin contained in the core layer by 20° C. or more. By controlling the melting point of the crystalline polyolefin resin to fall within the range, the fusibility of the expanded beads to each other in in-mold molding can be further enhanced. By in-mold molding the expanded beads excellent in fusibility, the beads can fully fuse to each other and therefore a molded article excellent in solvent resistance can be stably produced without detracting from the solvent resistance that the expanded beads have. From this viewpoint, the melting point difference between the crystalline polyolefin resin and the crystalline polylactic acid resin is preferably 30° C. or more, more preferably 40° C. or more, and the upper limit of the melting point difference is approximately 60° C. or so.

Specifically, the melting point of the crystalline polyolefin resin is preferably 130° C. or lower, and the lower limit of the melting point is approximately 100° C.

The melting point of the resin in the present invention is a value obtained as a peak top temperature of the melting peak of a DSC curve obtained through heat flux differential scanning calorimetry under the condition of "a case of measuring a melting temperature after predetermined heat treatment" (in which the heating rate and the cooling rate for conditioning the test piece is 10° C./min each) as described in JIS K 7121 (1987), at a heating rate of 10° C./min.

In the case where the DSC curve has plural melting peaks, the peak top temperature of the melting peak at the highest temperature is referred to as the melting point.

The melt flow rate (MFR) of the crystalline polyolefin resin is not specifically limited so far as it falls within a range capable of attaining the object and the effect of the present invention. Approximately, the melt flow rate is 0.5 to 25 g/10 min, more preferably 1 to 20 g/10 min. The MFR is measured according to JIS K 7210-1 (2014), under the condition of a test temperature of 190° C. and a nominal load of 2.16 kg.

(Content of Crystalline Polyolefin Resin in Coating Layer)

The content of the crystalline polyolefin resin in the coating layer is 3% by weight or more and less than 50% by weight. In the coating layer, where the content of the crystalline polyolefin resin is too small, the solvent resistance of the coating layer itself would be insufficient and the solvent resistance of the molded article of expanded beads obtained by molding the expanded beads may lower. Specifically, when the molded article is exposed to a solvent, the fused surfaces of the expanded beads may be dissolved to cause interlayer peeling between the beads whereby the mechanical properties of the molded article may greatly lower, and further the expanded beads fused together may separate whereby the molded article may collapse.

On the other hand, when the content of the crystalline polyolefin resin is too large, the coating layer itself could have solvent resistance but the solvent resistance of the molded article of expanded beads to be obtained by in-mold molding may lower. Though not clear, the reason would be because the polylactic acid resin and the crystalline polyolefin resin are non-miscible with each other, and therefore, when the content of the crystalline polyolefin resin is too much, cracks may readily form between the polylactic acid resin and the crystalline polyolefin resin in in-mold molding so that the molded article would be readily influenced by solvent. In addition, when the content of the crystalline polyolefin resin further increases, the core layer and the coating layer of the expanded bead may peel from each other and at the same time, the solvent resistance of the molded article of expanded beads obtained by in-mold molding may lower. From these viewpoints, the upper limit of the content of the crystalline polyolefin resin in the coating layer is preferably 40% by weight or less, more preferably 30% by weight or less.

(Other Resins Mixable in Coating Layer)

The resin constituting the coating layer in the present invention may contain, as mixed therein, any other resins except the amorphous polylactic acid resin and the crystalline polyolefin resin, within the range not detracting from the object and the effect of the present invention.

The other resins includes polystyrene resins, polyester resins except polylactic acid resin, etc. Above all, from the viewpoint of environmental load reduction, a biodegradable aliphatic polyester resin containing at least 35 mol % of an aliphatic ester component unit is preferred.

The content of the other resin in the coating layer is preferably 20% by weight or less relative to the total amount, 100% by weight of the resins constituting the coating layer, more preferably 10% by weight or less, even more preferably 0% by weight.

(Method for Forming Coating Layer)

The coating layer in the present invention is not always needed to coat entirely the expanded beads, within a range capable of attaining the object and the effect of the present invention, and the forming method is not also specifically limited.

Regarding the method for forming a coating layer on the expanded beads, for example, there may be mentioned a method where resin beads (unexpanded) and expanded beads for forming a core layer are put into a mixing machine or the like, the surfaces thereof are heated, and thereafter a powder of a mixed resin for forming a coating layer is put into the mixing machine, and the two are mixed to thereby form a coating layer on the surface of the core layer by melt coating. In addition, a coextrusion method to be mentioned below may also be employed.

The present invention does not always exclude an expanded resin to constitute the coating layer, and within a range capable of attaining the object and the effect of the present invention, the coating layer may be expanded.

(Additives Addable to Expanded Beads)

In the present invention, for example, any known coloring method where a black, gray, brown, blue, green or the like coloring pigment or dye is added to expanded beads may be employed to give colored expanded beads and a colored molded article of expanded beads. As a specific example, where the expanded beads in the present invention are produced according to a dispersing medium release expanding method to be mentioned below, a coloring pigment or dye is added to the pressure resistant vessel when polylactic acid resin beads, a dispersing medium and a blowing agent are put thereinto to give colored polylactic acid resin expanded beads and further a colored molded article of expanded beads. The coloring agent includes organic or inorganic pigments, dyes, etc. As these pigments and dyes, any known one is employable.

In addition, a flame retardant, an antistatic agent, a weather-resisting agent, an electroconductivity imparting agent and the like may be incorporated in the expanded beads in the present invention as additives therein, in addition to the above-mentioned coloring agent.

The additives may be directly kneaded in the resin to constitute the core layer or the coating layer, but in consideration of the dispersibility of the additives in the resin, it is desirable that a master batch of the additive is prepared, and this is kneaded with the resin to thereby add the additive to the resin.

The amount of the additive may vary depending on the kind of the additive. In general, the amount is 0.001 to 20 parts by weight relative to 100 parts by weight of the resin to constitute the core layer or the coating layer, more preferably 0.01 to 5 parts by weight.

(Ratio by Weight of Core Layer to Coating Layer)

In the present invention, the ratio by weight of the resin to constitute the core layer in the expanded bead to the resin to constitute the coating layer therein is preferably 80/20 to 97/3. When the ratio by weight of the core layer to the coating layer is controlled to fall within the range, the fusibility between the expanded beads is improved and a molded article of expanded beads having more excellent mechanical properties can be obtained. In addition, since the proportion of the core layer that contributes toward improving the physical properties of the molded article of expanded beads is high, the mechanical properties of the molded article can be further more improved.

From the above-mentioned viewpoint, the ratio by weight of the core layer to the coating layer is preferably 85/15 to 97/3, more preferably 90/10 to 97/3.

(Apparent Density of Expanded Beads, and Method for Measurement Thereof)

The apparent density of the expanded beads in the present invention is, from the viewpoint of lightweightness, in-mold moldability and excellent mechanical properties, preferably 25 to 400 kg/m$^3$, more preferably 40 to 200 kg/m$^3$.

In this description, the apparent density of the expanded beads is measured as follows.

First, the expanded beads are left in a temperature-controlled room under the condition of a relative humidity 50% and at 23° C. under an atmospheric pressure, for 10 days. Next, in the same temperature-controlled room, the weight W1 (g) of about 500 ml of the expanded beads left as above for 10 days is measured, and the expanded beads whose weight was measured are sunk in a measuring cylinder filled with water at a temperature of 23° C., using a tool such as a wire cloth or the like. Next, the volume V1 (L) of the expanded beads read from the water level increase, from which the volume of the tool such as a wire cloth has been subtracted, is measured, and the weight W1 of the expanded beads put in the measuring cylinder is divided by the volume V1 (W1/V1) to give the apparent density of the expanded beads.

(Average Cell Diameter of Expanded Beads, and Method for Measurement Thereof)

The average cell diameter of the expanded beads in the present invention is, from the viewpoint of in-mold moldability and further improvement of outward appearance of the molded article of expanded beads to be obtained, preferably 30 to 500 μm, more preferably 50 to 250 μm.

The average cell diameter of the expanded beads is measured as follows.

First, a photographic picture of the cut surface of a nearly bisected expanded bead is taken via a microscope. Next, in the enlarged image of the thus-photographed cut surface, four lines each running through nearly the center of the cut surface are drawn from one surface to the other surface of the expanded bead. At that time, the lines are so drawn that each could form a straight radial line extending in eight directions at equal intervals, from nearly the center of the cut surface to the outer surface of the cut bead. Next, the total number (N) of the cells pores that intersect with the above-mentioned four lines is counted. Subsequently, the sum total L (μm) of the length of the four lines is calculated, and the sum total L is divided by the total number N to give a value L/N, and this is the average cell diameter of one expanded bead.

Ten expanded beads are analyzed in that manner, and the arithmetic average of the found data of the average cell diameter of each expanded bead is referred to as the average cell diameter of the expanded beads.

(Closed Cell Content in Expanded Beads, and Method for Measurement Thereof)

The closed cell content in the expanded beads in the present invention is preferably 80% or more, more preferably 85% or more, even more preferably 90% or more. When the closed cell content is controlled to fall within the range, the secondary expandability of the expanded beads is improved and a molded article of expanded beads having more excellent mechanical properties can be thereby obtained.

The closed cell content in the expanded beads may be measured as follows. The expanded beads are allowed to stand for aging in constant temperature and humidity room at 23° C. under an atmospheric pressure and a relative humidity of 50% for 10 days. In the same room, about 20 cm$^3$ bulk volume of expanded beads thus aged are sampled and measured for the precise apparent volume Va by a water immersion method.

The sample whose apparent volume Va has been measured is fully dried, and measured for its true volume Vx according to the procedure C of ASTM-D2856-70 using Air Comparison Pycnometer Type-930 manufactured by Toshiba Beckman Inc. From the volumes Va and Vx, the closed cell content is calculated by the following formula (4). The same measurement is repeated for the sample which is groups of expanded beads differing in every measurement, and the average value of N=5 is calculated and referred to as the closed cell content in the expanded beads.

$$\text{Closed cell content } (\%) = (Vx - W/\rho) \times 100 / (Va - W/\rho) \quad (4)$$

wherein:

Vx represents the true volume (cm$^3$) of the expanded beads measured by the above-mentioned method, which corresponds to sum of volume of the resin constituting the expanded beads and a total volume of all the closed cells in the expanded beeds, Va represents an apparent volume (cm$^3$) of the expanded beads, which is measured by a rise of the water level when the expanded beads are immersed in water contained in a measuring cylinder, W is a weight (g) of the sample expanded beads used for the measurement; and ρ is a density (g/cm$^3$) of the resin constituting the expanded beads.

(Molded Article of Expanded Beads)

The molded article of expanded polylactic acid resin beads of the present invention is obtained by in-mold molding the above-mentioned, expanded polylactic acid resin beads of the present invention.

The shape of the molded article is not specifically limited, and not only tabular, columnar, vessel-like or block-shaped molded articles but also any others having a three-dimensional complicated shape can be obtained. In addition, thick molded articles can also be obtained.

The molded article of the present invention is formed of the above-mentioned specific expanded beads of the present invention and can be therefore a molded article of expanded beads excellent in fusibility of expanded beads to each other and excellent in mechanical properties and solvent resistance.

When the molded article of expanded beads of the present invention is heat-treated to further promote the crystallization of the polylactic acid resin therein, it may be a molded article of expanded beads more excellent in rigidity, high-temperature compression strength, and heat resistance such as dimensional stability, etc.

(Difference Between Endothermic Calorific Value and Exothermic Calorific Value in the Core Layer of Expanded Beads and Those in Molded Article of Expanded Beads)

The difference between the exothermic calorific value (Bf: exo) and the endothermic calorific value (Bf: endo) [(Bf: endo)–(Bf: exo)] in the core layer of the expanded beads in the molded article of expanded beads is, from the viewpoint of the solvent resistance of the molded article, preferably around 5 J/g or more, more preferably 10 J/g or more. The upper limit is not specifically limited, and may be approximately 60 J/g, more preferably 50 J/g.

The above-mentioned [(Bf: endo)–(Bf: exo)] indicates the difference between the endothermic calorific value (Bf: endo), which is the calorific value absorbed by the crystalline part that the expanded beads already have had before heat flux differential scanning calorimetry and by the part of the expanded beads that has been crystallized in the heating process in the measurement, and the exothermic calorific value (Bf: exo), which is the calorific value released by crystallization of the expanded beads during the heating process in heat flux differential scanning calorimetry. When the value of the difference is large and is closer to the value of the endothermic calorific value (Bf: endo), it means that the crystallization of the expanded beads has proceeded before the measurement (that is, the degree of crystallinity of the expanded beads is large).

The exothermic calorific value (Bf: exo) and the endothermic calorific value (Bf: endo) of the core layer in the expanded beads and in those of the molded article of expanded beads are the values that are obtained on the basis of the DSC curve to be obtained in melting 1 to 4 mg of a sample for measurement by heating from 23° C. to a temperature higher by 30° C. than the melting peak end temperature at a heating rate of 10° C./min (hereinafter also referred to as "first-time DSC curve (I)"), according to the heat flux differential scanning calorimetry method described in JIS K7122-1987. The above-mentioned [(Bf: endo)–(Bf: exo)] is obtained from the difference between the exothermic calorific value (Bf; exo) and the endothermic calorific value (Bf: endo).

The exothermic calorific value (Bf; exo) and the endothermic calorific value (Bf: endo) are measured according to the following standards.

The exothermic calorific value (Bf: exo) of the expanded beads is the value to be obtained from the area of the part surrounded by the straight line that connects a point "c" and a point "d" and the DSC curve, where the point "c" is a point at which the exothermic peak separates from the baseline on the low-temperature side of the exothermic peak (same as the crystallization peak) in the first-time DSC curve (I), and the point "d" is a point at which the exothermic peak returns to the baseline on the high-temperature side. The endothermic calorific value (Bf endo) of the expanded beads is the value to be obtained from the area surrounded by the straight line connecting a point "e" and a point "f" and the DSC curve, where the point "e" is a point at which the melting peak separates from the base line on the low-temperature side of the melting peak (same as the endothermic peak) of the first-time DSC curve (I), and the point "f" is a point at which the melting peak returns to the base line on the high-temperature side. The measurement device is so controlled that the baseline in the first-time DSC curve (I) could be as straight as possible.

In addition, in the case where the baseline is curved, a point at which the exothermic peak separates from the curved base line on the low-temperature side when the curved base line on the low-temperature side of the exothermic peak is extended toward the high-temperature side while the curved state of the base line is kept as such is referred to as the point "c", and a point at which the exothermic peak returns back to the curved high-temperature side baseline when the curved base line on the high-temperature side of the exothermic peak is extended toward the low temperature side while the curved state of the base line is kept as such is referred to the point "d". Further, a point at which the melting peak separates from the curved base line on the low-temperature side when the curved base line on the low-temperature side of the melting peak is extended toward the high-temperature side while the curved state of the curve is kept as such is referred to as the point "e", and a point at which the melting peak returns back to the curved high-temperature side baseline when the curved base line on the high-temperature side of the melting peak is extended toward the low temperature side while the curved state of the base line is kept as such is referred to the point "f".

Figure 3:
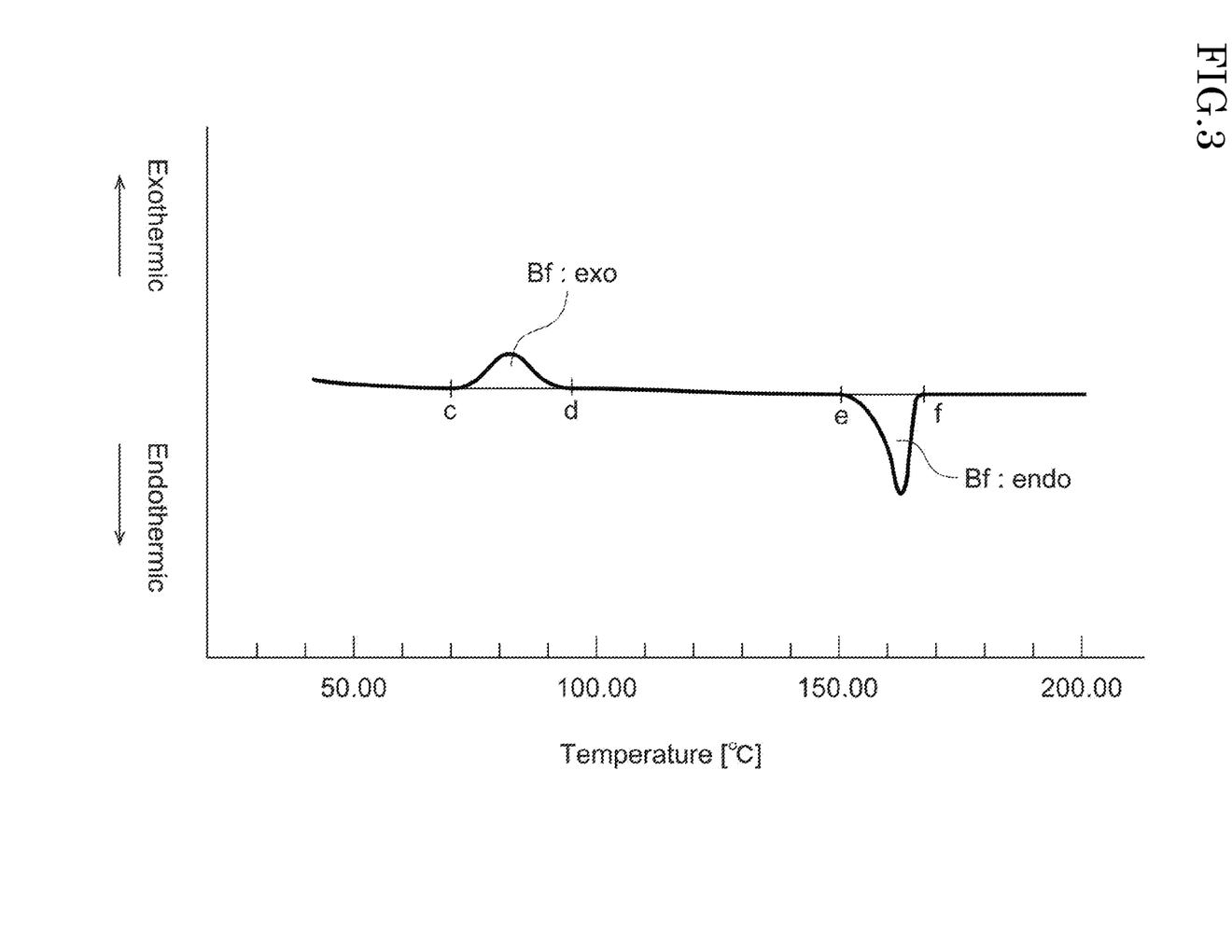
FIG. 3 is a first exemplification of a first-time DSC curve (I) showing the exothermic calorific value (Bf: exo) and the endothermic calorific value (Bf: endo) of a core layer of expanded beads obtained through heat flux differential scanning calorimetry.

For example, in the case shown in FIG. 3 as a first exemplification, the exothermic calorific value (Bf: exo) of the expanded beads is obtained from the area surrounded by the straight line that connects the point "c" and the point "d" as defined in the manner as above and by the DSC curve; and the endothermic calorific value (Bf: endo) of the expanded beads is obtained from the area surrounded by the straight line that connects the point "e" and the point "f" as defined in the manner as above and by the DSC curve.

Figure 4:
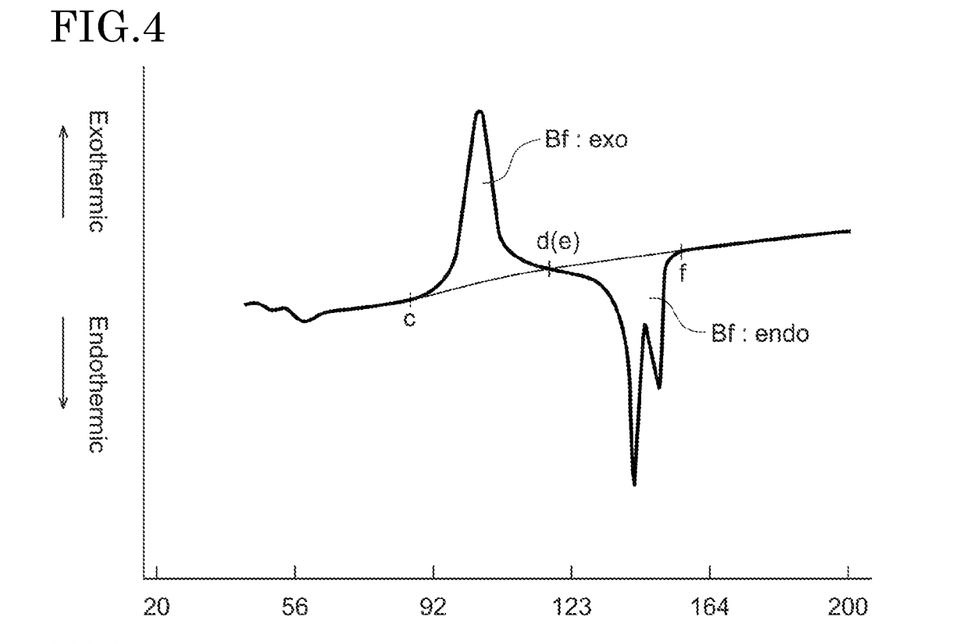
FIG. 4 is a second exemplification of a first-time DSC curve (I) showing the exothermic calorific value (Bf: exo) and the endothermic calorific value (Bf: endo) of a core layer of expanded beads obtained through heat flux differential scanning calorimetry.

In addition, in the case shown in FIG. 4 as a second exemplification, it is difficult to define the point "d" and the point "e" like in the above, and therefore in the case, the intersection of the straight line that connects the point "c" and the point "f" and the DSC curve is defined as the point "d" (point "e"), by which the exothermic calorific value (Bf: exo) and the endothermic calorific value (Bf: endo) of the expanded beads are obtained.

Figure 5:
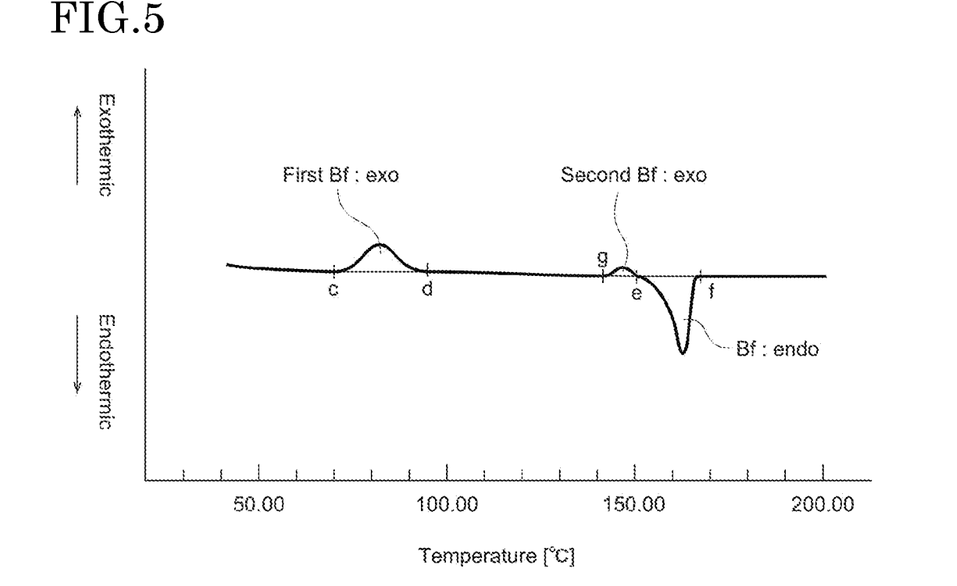
FIG. 5 is a third exemplification of a first-time DSC curve (I) showing the exothermic calorific value (Bf: exo) and the endothermic calorific value (Bf: endo) of a core layer of expanded beads obtained through heat flux differential scanning calorimetry.

Further, as in FIG. 5 showing a third exemplification, in the case where a small exothermic peak appears on the low-temperature side of the melting peak, the exothermic calorific value (Bf: exo) of the expanded beads is obtained from the sum of the area A of the first exothermic peak and the area B of the second exothermic peak in FIG. 5. Specifically, the point at which the first exothermic peak separates from the baseline on the low-temperature side of the first exothermic peak is referred to as a point "c", and the point at which the first exothermic peak returns back to the baseline on the high-temperature side is referred to as a point "d"; and the part surrounded by the straight line that connects the point "c" and the point "d" and by the DSC curve is the area A. With that, the point at which the second exothermic peak separates from the baseline on the low-temperature side of the second exothermic peak is referred to as a point "g", the point at which the melting peak returns back to the baseline on the high-temperature side is referred to as a point "f", the intersection of the straight line that connects the point "g" and the point "f" and the DSC curve is defined as a point "e", and the area surrounded by the straight line that connects the point "g" and the point "e" and the DSC curve is the area B. With that, in FIG. 5, the endothermic calorific value (Bf: end) of the expanded beads is the value to be obtained from the area surrounded by the straight line that connects the point "e" and the point "f" and by the DSC curve.

(Bulk Density of Molded Article, and Method for Measurement Thereof)

The bulk density of the molded article of expanded beads of the present invention, obtained in the manner as above, is, from the viewpoint of lightweightness and excellent mechanical properties, preferably 15 to 300 kg/m$^3$, more preferably 25 to 180 kg/m$^3$. The bulk density of the molded article of expanded beads is measured as follows.

First, from the outside dimension of the molded article of expanded beads left in an environment at a temperature of 23° C. and a relative humidity of 50% for 24 hours or more, the bulk volume thereof is obtained. Next, the mass (g) of the molded article of expanded beads is measured accurately, and this is divided by the bulk volume and processed for unit conversion to give the bulk density (kg/m$^3$) of the molded article of expanded beads.

(Bending Strength/Bulk Density of Molded Article)

Regarding the molded article of expanded beads of the present invention, the ratio of the bending strength (kPa) to the bulk density (kg/m$^3$) thereof (bending strength/bulk density) is preferably 13 or more (kPa·m$^3$/kg). Regarding the ratio (bending strength/bulk density) falling within the range, it is considered that, since the polylactic acid resin and the crystalline polyolefin resin that are immiscible with each other are incorporated in a suitable ratio in the coating layer of the expanded beads, the expanded beads are fully fused together without too much increasing the interface of the polylactic acid resin and the crystalline polyolefin resin, and in addition, there exist few voids in the surface or in the inside of the molded article of expanded beads and also between the expanded beads. Accordingly, when the ratio of bending strength/bulk density is controlled to fall within the above range, the molded article can have excellent mechanical properties and, in addition, the solvent resistance of the molded article can be effectively enhanced.

From the above-mentioned viewpoint, the ratio of the bending strength (kPa) to the bulk density (kg/m$^3$) (bending strength/bulk density) is more preferably 13.5 or more (kPa·m$^3$/kg), even more preferably 14 or more (kPa·m$^3$/kg). On the other hand, the upper limit thereof is approximately 20 or so (kPa·m$^3$/kg). The bending strength of the molded article of expanded beads is measured according to the method described in JIS K 7221-2 (1999).

The bending strength of the molded article of expanded beads is preferably 400 to 2800 kPa. The lower limit thereof is more preferably 450 kPa, even more preferably 500 kPa, and the upper limit thereof is more preferably 1800 kPa, even more preferably 1200 kPa.

(Closed Cell Content in Molded Article, and Method for Measurement Thereof)

The closed cell content in the molded article of the present invention is preferably 60% or more, more preferably 70% or more, even more preferably 80% or more. When the closed cell content in the molded article is controlled to fall within the above range, a molded article excellent in mechanical properties such as compression strength and the like can be obtained.

The closed cell content in the molded article of expanded beads may be measured in the same manner as in the measurement of the closed cell content in the expanded beads mentioned above, except that a sample of 25×25×30 mm is cut out of the center part of the molded article of expanded beads (in which the skin (surface skin part) is entirely cut off) to prepare a sample for measurement. In the case where a sample for measurement having the above-mentioned dimension and thickness could not be cut out at a time, plural pieces of the molded article that have been cut out in a size of 25×25×arbitrary thickness (mm) (where the skin (surface skin part) is entirely cut off) are piled up to prepare a sample of 25×25×30 mm, and this may be used in measurement.

(Fusion-Bonding Ratio in Molded Article, and Method for Measurement Thereof)

The molded article of expanded beads of the present invention is excellent in fusion-bonding of the expanded beads therein to each other, and the fusion-bonding ratio therein is preferably 60% or more, more preferably 70% or more, even more preferably 80% or more.

The molded article of expanded beads having a high fusion-bonding ratio can be excellent in mechanical properties, especially in bending strength. The fusion-bonding ratio means the material failure ratio based on the number of the expanded beads in the broken surface in breaking the molded article of expanded beads. At that time, the part where the expanded beads are not fused together does not undergo material failure and peels at the interface of the expanded beads. The method for measuring the fusion-bonding ratio of the molded article is shown in the section of Examples to be given hereinunder.

(Composite Molded Article)

The molded article of expanded polylactic acid resin beads of the present invention can be used as a member (core material) of heretofore-known FRP composite molded articles, such as bathtubs, water tanks, temporary toilets, chairs, water-proofed floors, panels for vehicles, vehicle bodies, ship bodies, floats, surfboards, snowboards, helmets, door panels for vehicles, bodies of solar power plants, etc.

FRP composite molded articles are those in which a thermosetting resin layer containing a reinforcing fibrous substance is adhered to and laminated on the molded article of expanded polylactic acid resin beads of the present invention.

For forming the thermosetting resin layer, any conventional one, for example, an unsaturated polyester resin prepared by dissolving an unsaturated polyester obtained through esterification of an unsaturated dicarboxylic acid (fumaric acid, maleic acid, etc.) or the like and a polyalcohol (ethylene glycol, etc.) in a solvent such as styrene or the like may be used. The unsaturated polyester resin is, optionally after a fibrous substance such as glass fibers or the like is incorporated therein, layered on the surface of a molded article of expanded polylactic acid resin beads and cured thereon to form a thermosetting resin layer.

For the method for forming the thermosetting resin layer, any conventional molding methods are employable, including hand lay-up molding, resin transfer molding (RTM), seat molding compound (SMC), bulk molding compound (BMC), etc.

The molded article of expanded polylactic acid resin beads produced by in-mold molding the expanded polylactic acid resin beads of the present invention is, as described above, excellent in solvent resistance, and is therefore favorably used as a member of FRP composite molded articles that are required to be lightweight, to be able to keep the shape of the molded article even after exposed to solvent (styrene, etc.), and to have excellent mechanical properties.

(Method for Producing Expanded Beads)

A method for producing the expanded polylactic acid resin beads of the present invention is described hereinunder.

The method for producing the expanded beads of the present invention includes an extrusion expanding method, a gas impregnation pre-expanding method, a dispersing medium release expanding method, and other expanding methods based on these methods and principles.

An extrusion expanding method is a method for producing expanded beads in which, for example, a polylactic acid resin is melt-kneaded in an extruder, a physical blowing agent is introduced into the extruder under pressure and kneaded with the resin therein to give an expandable molten resin, then the expandable molten resin is extruded out through a multihole die and the resultant expanded strands are cut into expanded beads. In this method, the resin beads production step, the blowing agent impregnation step and the expanding step are carried out as one continuous process using one extruder. For the method, JP-A2007-100025 and WO2008/123367 may be referred to.

In the case where the expanded beads of the present invention are obtained according to the extrusion expanding method, those that satisfy the constituent requirements of the core layer and the coating layer of the expanded beads of the present invention can be obtained by a co-extrusion expanding method.

A gas impregnation pre-expanding method is a method for producing expanded beads, in which, for example, a polylactic acid resin is melt-kneaded in an extruder, then the resin is extruded to be strands and cut to give resin beads, the resin beads are put into a pressure resistant vessel, a physical blowing agent is introduced into the pressure resistant vessel under pressure so that the blowing agent could be impregnated into the resin beads to prepare expandable resin beads, and the expandable resin beads are put into a pre-expanding vessel and heated therein by a heating medium such as steam, hot air or a mixture thereof to thereby expand the expandable resin beads to give expanded beads. In forming the resin beads, a strand cutting method, an underwater cutting method or the like may be suitable selected. In the step of introducing a physical blowing agent into the pressure resistant vessel under pressure to thereby impregnate the resin beads with the blowing agent, a liquid phase impregnation method or a vapor phase impregnation method may be suitably selected. In the gas-impregnating pre-expanding method, the resin beads production step, the blowing agent impregnation step and the expanding step are carried out as separate steps. For the method, JP-A2000-136261 and JP-A2006-282750 may be referred to. In the case where the expanded beads of the present invention is obtained according to the gas impregnation pre-expanding method, each of the resin beads is composed of a core layer and a coating layer are formed according to the co-extrusion molding method to be mentioned below, and from the resin beads, expanded beads satisfying the constituent requirements of the core layer and the coating layer of the present invention can be obtained.

A dispersing medium release expanding method is a method for producing expanded beads, in which, for example, a polylactic acid resin is melt-kneaded in an extruder, then the resin is extruded to be strands and cut to give resin beads, the resin beads are dispersed in an aqueous medium in a closed vessel, heated, and the resin beads are impregnated with a physical blowing agent to give expandable resin beads, the expandable resin beads are released from the closed vessel along with the aqueous medium at a suitable foaming temperature to produce expanded beads. In this method, the resin beads production step, the blowing agent impregnation step and the expanding step may be carried out as separate steps, but in general, the blowing agent impregnation step and the expanding step are carried out as one process.

Regarding the production method for the expanded polylactic acid resin beads, the dispersing medium release expanding method is described in detail hereinunder.

(Resin Beads Production Step)

In the resin beads production step, resin beads may by produced according to a strand cutting method, an underwater cutting method or the like in which a resin added with necessary additives is melt-kneaded, extruded and cut for pelletization.

Each of the resin beads is formed of an expanded core layer and a coating layer can be produced, for example, utilizing the co-extrusion molding technique described in JP-B 41-16125, JP-B 43-23858, JP-B 44-29522 and JP-A60-185816.

(Weight and Shape of Resin Beads)

The average weight per one resin bead is, from the viewpoint of productivity of the resin beads and the easiness in filling them in a mold, and from the uniformity of the density distribution of the expanded beads to be obtained, preferably 0.05 to 10 mg, more preferably 0.1 to 4 mg.

As the shape of the resin beads, a columnar, spherical, prismatic, oval, cylindrical or the like shape may be employed. The expanded beads obtained by expanding such resin beads may have a shape nearly corresponding to the shape of the unexpanded resin beads.

(Step of Drying Polylactic Acid Resin)

In the step of melt-kneading the base resin in the extruder, and extruding out into strands there through to give resin beads as mentioned above, it is desirable that the polylactic acid resin that is a constituent component of the base resin is previously dried. In this case, the polylactic acid resin can be prevented from being degraded through hydrolysis in the extruder. In addition, for preventing the polylactic acid resin from being degraded through hydrolysis, a method of using a vented extruder is also employable where moisture is removed from the polylactic acid resin through vacuum suction. By removing moisture from the polylactic acid resin, the resin beads may be prevented from having foams inside them and the stability in extrusion production can be thereby enhanced.

(Blowing Agent Impregnation Step, Expanding Step)

Next, the blowing agent impregnation step and the expanding step in the dispersing medium release expanding method are described.

In the dispersing medium release expandable method, the resin beads are impregnated with a physical blowing agent to prepare expanding resin beads, for example, according to a method of dispersing the resin beads in a dispersing medium along with a physical blowing agent in a pressure resistant vessel and heating them therein, or a method of dispersing the resin beads in a dispersing medium in a pressure resistant vessel, heating them therein, and then introducing a physical blowing agent into the pressure resistant vessel. Next, the expandable resin beads are released along with the dispersing medium into a zone having a pressure lower than that in the pressure resistant vessel, whereby the expandable resin beads are foamed to give expanded beads.

(Foaming Aid)

A foaming aid may be previously added to the resin beads. As the foaming aid, for example, inorganic substances such as talc, calcium carbonate, borax, zinc borate, aluminium hydroxide, silica, etc.; a polymer substance such as polytetrafluoroethylene, polyethylene wax, polycarbonate, polyethylene terep hthalate, polypropylene terephthalate, polybutylene terephthalate, polycyclohexanedimethylene terep hthalate, polyethylene nap hthalate, polybutylene nap hthalate, silicone, methyl methacrylate -based copolymer, crosslinked polystyrene, etc. can be employed.

Among the above-mentioned foaming aid, in the preset invention, polytetrafluoroethylene, polyethylene wax, crosslinked polystyrene or the like is preferably used, and hydrophobic polytetrafluoroethylene powder is more preferred.

The foaming aid may be directly kneaded in a base resin, but in consideration of the dispersibility of the foaming aid in the resin, it is desirable that a master batch of the foaming aid is prepared, and it is kneaded with a base resin so as to add the aid to the resin.

By controlling the amount of the foaming aid to be added, the apparent density and the cell diameter in the expanded beads can be controlled.

In the case where a foaming aid is added, it is desirable that the aid is added in an amount of 0.001 to 5 parts by weight relative to 100 parts by weight of the base resin that constitutes the core layer and the coating layer of expanded resins, more preferably in an amount of 0.005 to 3 parts by weight, even more preferably 0.01 to 2 parts by weight.

A polylactic acid resin is readily hydrolyzed, and therefore, as the foaming aid, a hydrophobic substance is preferably selected. Using a hydrophobic foaming aid as the foaming aid, the apparent density of the expanded beads can be lowered and the cell diameter in the beads can be unified, while the polylactic acid resin is sufficiently prevented from being hydrolyzed.

(Blowing Agent Impregnation Step, Expanding Step)

In the dispersing medium release expanding method, as described above, for example, resin beads are dispersed in a dispersing medium such as water or the like in a pressure resistant closed vessel (for example, autoclave) along with a dispersant or the like thereinto, then the polylactic acid resin beads are impregnated with a blowing agent under a predetermined pressure and temperature, and thereafter the contents in the vessel are released into a zone having a pressure lower than that in the vessel to thereby expand the resin beads to give expanded beads. During release, it is desirable that a back pressure is given to the vessel. The expanded beads obtained according to the above-mentioned method may be again filled in a pressurizable closed vessel, after having been processed in an aging step under an atmospheric pressure, and then pressurized under a pressure of, for example, 0.01 to 0.10 MPa (G) by a pressurized gas such as air or the like to thereby increase a pressure inside the expanded beads, and after the operation, the expanded beads may be put into an vessel for expansion and heated therein by a heating medium such as hot air, steam, a mixture of air and steam or the like to give expanded beads having a further lowered apparent density (this step is hereinafter referred to as "two stage expansion").

From the viewpoint that, as compared with those in an extrusion expanding method, expanded beads having a low apparent density can be obtained and expanded beads excellent in in-mold moldability and in physical properties can be obtained, as the production method for expanded beads, the above-mentioned gas impregnation pre-expanding method or dispersing medium release expanding method is preferred, and in particular, the dispersing medium release expanding method is more preferred.

(Dispersing Medium)

As the dispersing medium for dispersing the above-mentioned resin beads, any solvent not dissolving the polylactic acid resin beads is usable, in addition to water mentioned above. Examples of the other dispersing medium except water include ethylene glycol, glycerin, methanol, ethanol, etc. Water is preferably used as the dispersing medium.

In dispersing resin beads in a dispersing medium, if desired, a dispersant may be added to the dispersing medium. The dispersant includes inorganic substances such as aluminium oxide, calcium tertiary phosphate, magnesium pyrophosphate, titanium oxide, zinc oxide, basic magnesium carbonate, basic zinc carbonate, calcium carbonate, kaolin, mica, clay, etc.; water-soluble polymer protective colloid agents such as polyvinylpyrrolidone, polyvinyl alcohol, methyl cellulose, etc. As a dispersion aid, an anionic surfactant such as sodium dodecylbenzenesulfonate, sodium alkanesulfonate or the like may be added to the dispersing medium.

The dispersant may be used in an amount of 0.05 to 3 parts by weight relative to 100 parts by weight of the resin beads, and the dispersion aid may be used in an amount of 0.001 to 0.3 parts by weight relative to 100 parts by weight of the resin beads.

(Blowing Agent)

As the blowing agent, for example, one alone or two or more of an organic physical blowing agent, for example, a hydrocarbon such as butane, pentane, hexane or the like, or a halogenohydrocarbon such as trichlorofluoromethane, dichlorofluoromethane, tetrachlorodifluoroethane, dichloromethane or the like, or an inorganic physical blowing agent such as carbon dioxide, nitrogen, air or the like may be used either singly or as combined.

Among these physical blowing agents, a physical blowing agent containing, as the main component, an inorganic physical blowing agent such as carbon dioxide, nitrogen, air or the like is preferably used, and carbon dioxide is more preferred. The wording "containing an inorganic physical blowing agent as the main component" means that the content of the inorganic physical blowing agent is 50 mol % or more, preferably 70 mol % or more, more preferably 90 mol % or more in 100 mol % of all the physical blowing agents.

The amount of the physical blowing agent to be added may be suitably controlled depending on the kind of the blowing agent, the blend amount of other additives, the apparent density of the expanded beads to be formed, etc. The inorganic physical blowing agent may be used in an amount of approximately 0.1 to 30 parts by weight, preferably 0.5 to 15 parts by weight, more preferably 1 to 10 parts by weight relative to 100 parts by weight of the resin beads.

(Method for Producing the Molded Article)

Next, a method for producing the molded article of expanded beads using the expanded beads of the present invention is described.

In producing the molded article of expanded beads, a known in-mold molding method can be employed.

For example, there are mentioned a compression molding method, a cracking molding method, a pressure molding method, a compression filling molding method, an ambient pressure filling molding method (for example, see JP-B 46-38359, JP-B 51-22951, JP-B 4-46217, JP-B 6-22919, JP-B 6-49795) and the like, using a conventional expanded beads molding tool.

As an in-mold molding method generally preferably employed, for example, there is mentioned a batch-type in-mold molding method where expanded beads are filled in the cavity of a conventional mold for in-mold molding of thermoplastic resin expanded beads, which can be heated and cooled and which can be opened, closed and airtightly sealed up, the expanded beads are heated in the mold while steam having a saturated steam pressure of 0.01 to 0.25 MPa (G), preferably 0.01 to 0.20 MPa (G) is supplied thereinto so that the beads are expanded and fused, and thereafter the resultant molded article of expanded beads is cooled and taken out of the cavity.

As a method for supplying steam, any conventional method is employable where various heating methods such as one-direction flow heating, reversed one-direction flow heating, substantial heating or the like are combined in an arbitrary manner. In particular, a method where expanded beads are heated in an order of preheating, one-direction flow heating, reversed one-direction flow heating, and substantial-heating is preferred.

In addition, the molded article of expanded beads may also be produced according to a continuous in-mold molding method where expanded beads are continuously fed into a mold formed by belts continuously moving along the upper and lower sides in a path, and while they pass through a steam heating zone, steam having a saturated steam pressure of 0.01 to 0.25 MPa (G) is supplied thereto to foam and fuse-bond the expanded beads together, and thereafter they are cooled while passing through a cooling zone, and then the resultant molded article of expanded beads is taken out of the path, and successively cut into a suitable length (for example, see JP-A 9-104026, JP-A 9-104027 and JP-A 10-180888).

Prior to the in-mold molding, the expanded beads obtained according to the above-mentioned method may be filled in a pressure resistance closed vessel, then pressurized therein by a pressure gas such as air or the like to increase the inner pressure inside the cells of expanded beads to be 0.01 to 0.15 MPa (G), and thereafter the expanded beads may be taken out of the vessel and then molded in the cavity of a mold, and the in-mold moldability of the expanded beads can be furthermore enhanced.

As described above, the polylactic acid resin expanded beads of the present invention are multilayer expanded beads, in which each bead is formed of a crystalline polylactic acid resin expanded core layer and a coating layer to coat the expanded core layer, in which the coating layer contains an amorphous polylactic acid resin and a crystalline polyolefin resin as mixed in a specific ratio, and accordingly, the polylactic acid resin expanded beads can be excellent in solvent resistance while keeping the excellent fusibility of the expanded beads to each other therein in in-mold molding.

By molding the above-mentioned polylactic acid resin expanded beads excellent in fusibility and solvent resistance in the cavity of a mold, the expanded beads can be fully fused to each other, therefore the molded article of the polylactic acid resin expanded beads has excellent solvent resistance without detracting from the solvent resistance of the expanded beads.

EXAMPLES

Next, the present invention is described in more detail by Examples.

The base resins used in the present invention and their physical properties are shown in Table 1.

TABLE 1

| Kind of Resin | Crystalline Polylactic Acid (D-form proportion: 4.4 wt %) | Amorphous Polylactic Acid (D-form proportion: 12.2 wt %) | Polypropylene | Polyethylene | Polyethylene |
|---|---|---|---|---|---|
| Abbreviation | Crystalline PLA | (In Table 3, A-PLA) | PP1 | PE1 | PE2 |
| Manufacturer | Nature Works LLC | Nature Works LLC | Japan Polypropylene Corporation | Japan Polyethylene Corporation | Japan Polyethylene Corporation |
| Melting Point (° C.) | 157 | no | 128 | 109 | 124 |
| Endothermic Calorific value (J/g) | 49 | no | 55 | 47 | 105 |
| MFR (g/10 min) (190° C./2.16 kg) | 2.9 | 4.4 | 11.0 | 15.0 | 1.7 |

Examples 1 to 7, Comparative Examples 1 to 4

(Preparation of Base Resin for Forming Coating Layer)

A base resin to form the coating layer of expanded beads (expressed as "MB") was prepared to have a composition and a weight ratio as shown in Table 2. Briefly, MB1 to MB10 shown in Table 2 were prepared as follows. Along with the base resin, a carbodiimide compound (trade name: Stabaxol 1-LF manufactured by Rhein Chemie Corporation, bis(dipropylphenyl)carbodiimide), serving as a terminal blocking agent was fed into a twin-screw extruder having an inner diameter of 20 mm so that the content thereof could be 1.5% by weight, and at 200 to 220° C., melt-kneaded and extruded as strands, and the strands are cooled and cut. The base resins used in Examples and Comparative Examples are MB1 to MB10 shown in Table 2.

TABLE 2

| | Coating Layer Forming Resin | | | | |
|---|---|---|---|---|---|
| | MB1 | MB2 | MB3 | MB4 | MB5 |
| Composition | Amorphous PLA/PE1 | Amorphous PLA/PE1 | Amorphous PLA/PE1 | Amorphous PLA/PP1 | Amorphous PLA/PE1 |
| Weight Ratio | 85/15 | 95/5 | 70/30 | 90/10 | 60/40 |

| | Coating Layer Forming Resin | | | | |
|---|---|---|---|---|---|
| | MB6 | MB7 | MB8 | MB9 | MB10 |
| Composition | Amorphous PLA/PE2 | Amorphous PLA | Amorphous PLA/PE1 | Amorphous PLA/PE1 | Amorphous PLA/PE1 |
| Weight Ratio | 85/15 | 100% | 98/2 | 50/50 | 40/60 |

The amorphous PLA is expressed as "A-PLA" in Table 3-1 and Table 3-2.

(Production of Multilayer Resin Beads Having Core Layer and Coating Layer)

As an apparatus for production of multilayer resin beads each having a core layer and a coating layer, an extruder system equipped with a multilayer strand forming die on the outlet side of the extruder for core layer formation having an inner diameter of 65 mm and the extruder for coating layer formation having an inner diameter of 30 mm was used.

The base resins (MB) for forming the core layer and the coating layer shown in Tables 1 and 2 were separately supplied into the core layer forming extruder and the coating layer forming extruder, and melt-kneaded therein at 200 to 220° C. The kneaded melts were introduced into the co-extrusion die and merged in the die, and coextruded out through the small holes of the mouth piece attached to the extruder exit as multilayer strands each having a coating layer formed along the side (outer periphery) of the core layer. The co-extruded strands were cooled in water, and cut with a pelletizer into pellets each having a weight of 2 mg, and then dried to give multilayer resin beads.

To the polylactic acid resin for the core layer, a carbodiimide compound serving as a terminal blocking agent was added so that the content thereof could be 1.5% by weight, and a polytetrafluoroethylene (PTFE) powder (trade name: TFW-1000, manufactured by Seishin Enterprise Co., Ltd.) serving as a cell controlling agent was added so that the content thereof could be 1,000 ppm by weight, that is, the two were supplied to the core layer forming extruder.

Using MB1 for the coating layer in Examples 1 and 5, MB2 for the coating layer in Example 2, MB3 for the coating layer in Example 3, MB4 for the coating layer in Example 4, MB5 for the coating layer in Example 6, MB6 for the coating layer in Example 7, MB7 for the coating layer in Comparative Example 1, MB8 for the coating layer in Comparative Example 2, MB9 for the coating layer in Comparative Example 3, and MB10 for the coating layer in Comparative Example 4, multilayer resin beads were formed.

(Production of Expanded Beads)

Next, using the above-mentioned multilayer resin beads, polylactic acid resin expanded beads were produced.

First, 1 kg of the multilayer resin beads obtained in the manner as above were fed into a 5-liter closed vessel equipped with a stirrer along with 3 L of water serving as a dispersing medium, and further, 0.1 parts by weight of aluminium oxide serving as a dispersant and 0.01 parts by weight, as the amount of active ingredient thereof, of a surfactant (trade name: Neogen S-20F, manufactured by DKS Co., Ltd., sodium alkylbenzenesulfonate) were added to the dispersing medium. Next, with stirring, the closed vessel was heated up to 134.5° C., and carbon dioxide serving as a blowing agent was introduced under pressure into the closed vessel until the pressure could reach 3.5 MPa (G), and this was kept at the temperature for 15 minutes (Tables 3-1 and 3-2). Subsequently, while a back pressure was given to the system with carbon dioxide, the expandable resin beads, along with the dispersing medium, were released to atmospheric pressure, thereby foaming and expanding the expandable resin beads, to give expanded polylactic acid resin beads having an apparent density shown in Tables 3-1 and 3-2.

The amount (part by weight) of the dispersant and the surfactant is relative to 100 parts by weight of the polylactic acid resin beads.

The physical properties of the resultant expanded beads were measured, and the results are shown in Tables 3-1 and 3-2.

(Production of Molded Article)

Next, using the resultant expanded polylactic acid resin beads, a molded article of expanded beads was produced.

First, the expanded polylactic acid resin beads were filled in a mold for forming a tabular plate having a size of 200 mm length×250 mm width×20 mm thickness, and molded in the mold under pressure with steam heating to give a tabular molded article of expanded beads. For the steam heating, the drain valves on both sides were kept opened, and steam was applied for 5 seconds for preheating (purging step), subsequently, steam was supplied from the movable mold side for 5 seconds while the drain valve on the stationary mold side was opened, thereafter, steam was supplied from the stationary side for 10 seconds while the drain valve on the movable mold side was opened, and finally, the resin beads were molded by heating at the steam pressure (molding pressure) as shown in Tables 3-1 and 3-2.

After the heating, the mold was depressurized and cooled with water until the surface pressure by the expanding force of the molded article of expanded beads could lower to 0.02 MPa (G), then the mold was opened and the molded article of expanded beads was taken out of the mold. The resultant molded article of expanded beads was aged in an oven at 70° C. for 15 hours for crystallization. Subsequently, the molded article of expanded beads was gradually cooled down to room temperature to thereby obtain a molded article of expanded polylactic acid resin beads.

Various physical properties of the resultant molded article of expanded beads were evaluated, and the results are shown in Tables 3-1 and 3-2.

(Evaluation of Physical Properties)

The physical properties shown in Tables 3-1 and 3-2 were measured and evaluated as follows.

(Endothermic Calorific Value of Polylactic Acid Resin)

Endothermic calorific value of polylactic acid resin measured according to the above-mentioned method. As the sample for measurement of endothermic calorific value, 1 to 4 mg of the polylactic acid resin shown in Table 1 was used.

(Difference between endothermic calorific value and the exothermic calorific value of expanded beads and those in molded article of expanded beads [(Bf: endo)−(Bf: exo)])

Difference between endothermic calorific value and the exothermic calorific value of expanded beads and those in molded article of expanded beads [(Bf: endo)−(Bf: exo)] measured according to the above-mentioned method. For measurement of the endothermic calorific value, 1 to 4 mg of a sample for measurement was collected from the center part (core layer) of the expanded beads or from the center part (core layer) of the expanded beads in the molded article of expanded beads, and used.

As the sample for measurement, the center part of the expanded beads obtained by cut off the entire surface of the expanded beads collected from the molded article or expanded beads, and having a weight of ⅕ to ⅓ the weight of the expanded bead before being cut. Specifically, for the purpose of cutting out the expanded layer inside the expanded bead not containing the surface thereof, the expanded beads were cut with a cutter knife or the like, and the center part of the expanded bead was used for the measurement. At this time, the entire surface of one expanded bead was surely cut off and the center part of the expanded bead was cut out within a range of ⅕ to ⅓ the weight of the expanded bead before being cut so as to have as much as possible the same center as the center of the expanded bead. To prepare the sample for measurement, the bead was cut out so that it could have a shape as similar as possible to the shape of the uncut expanded bead.

In collecting the sample for measurement, when the amount of the sample for measurement obtained from one expanded bead is less than 1 to 4 mg, the measurement sample collecting operation was carried out for plural expanded beads, and the total weight of these was controlled so as to be 1 to 4 mg. In the case where the weight of one expanded beads is more than 4 mg, the expanded bead was divided equally to have the same shape, and the weight was thereby controlled.

The apparent density, the closed cell content and the average cell diameter of the expanded beads were measured according to the above-mentioned methods.

(Peeling of Coating Layer)

Regarding the fastness of the coating layer of the expanded beads obtained herein, the expanded beads were rubbed with fingers, whereupon those with no peeling were evaluated as "no", while those with peeling were evaluated as "yes".

(Fusion-bonding Ratio in Molded Article of Expanded Beads)

Regarding the fusion-bonding ratio in the molded article of expanded beads obtained herein, the molded article of expanded beads was broken, and among the expanded beads exposed on the broken surface thereof, the number of the expanded beads that had underwent material failure was counted to calculate the fusion-bonding ratio.

Using a cutter knife, the molded article of expanded beads was cut to a depth of about 3 mm in the thickness direction, and then the molded article of expanded beads was broken from the cut part. Next, the number (n) of the expanded beads existing in the broken surface and the number (b) of the expanded beads under material failure was measured, and the ratio of (b) to (n) (bin) was expressed as percentage and referred to as the fusion-bonding ratio (%).

(Bulk Density of Molded Article of Expanded Beads)

According to the above-mentioned method, that is, from the outside dimension of the molded article of expanded beads that had been left in an environment at a temperature of 23° C. and a relative humidity of 50% for 24 hours or more, the bulk volume was obtained. Next, the mass (g) of the molded article of expanded beads was accurately measured. Subsequently, the mass of the molded article of expanded beads was divided by the bulk volume thereof, and through unit conversion, the bulk density (kg/m³) of the molded article of expanded beads was obtained.

(Bending Strength and Bending Flexure Amount of Molded Article of Expanded Beads)

The bending strength and the bending deflection amount of the molded article of expanded beads before solvent treatment were measured according to the method described in JIS K7221-2 (1999). Specifically, first, a test sample of 120×25×20 mm was cut out of the molded article of expanded beads with the skin on one surface thereof, and was put on a holder in such a manner that the skin surface could face downward. Next, using an autograph apparatus manufactured by Shimadzu Corporation, the sample was tested in a bending test in which the distance between the supporting points was 100 mm and the test speed was 10 mm/min. The bending test was carried out 5 times, and the bending strength of each test piece was obtained from the maximum load to reach fracture, and the arithmetic average value was referred to as the bending strength. The arithmetic average value of the maximum deflection amounts at the measurement of the bending strength of each test piece was referred to as the bending deflection amount.

(Bending Strength/Bulk Density and Bending Deflection Amount/Bulk Density of Molded Article of Expanded Beads)

As indices of the mechanical properties of the molded article of expanded beads, the ratio of the bending strength or of the bending deflection amount to the bulk density was obtained as bending strength/bulk density and bending deflection amount/bulk density. The found value of the bending strength or the bending deflection amount was divided by the bulk density to give the ratio.

(Regarding Solvent Resistance)

For evaluating the solvent resistance of the molded article of expanded beads obtained here, the molded article was immersed in styrene, and the physical properties of the molded article after the immersion were measured. The results are shown in Tables 3-1 and 3-2.

Regarding the evaluation of the solvent resistance, the effect of the present invention is expressed relatively, and use of the expanded beads and the molded articles described in Comparative Examples is not restricted by these results.

The physical properties after the solvent treatment shown in Tables 3-1 and 3-2 were measured and evaluated as follows.

(Fusion-bonding State of Molded Article after Solvent Treatment)

From a tabular molded article of expanded beads having a thickness of 20 mm, a test piece having a size of 25 mm×90 mm×thickness of the molded article was cut out with the skin surfaces kept remaining on both sides thereof, and aged in an environment kept at a temperature of 23° C. and a humidity of 50% RH for 24 hours. Next, the aged test piece was put into a closed vessel filled with styrene in such a manner that it could be entirely immersed therein and left statically for 1 hour. Subsequently, the test piece was taken out, and evaluated in 6 ranks according to the following evaluation criteria.

(Evaluation Criteria for Fusion-Bonding State of Molded Article After Solvent Treatment)

Regarding the test pieces taken out of the closed vessel, those evaluated as "5" or more were considered as good.

6: When the test piece was broken by bending with both hands, it underwent material failure and 50% or more of the expanded beads existing in the broken surface of the test piece underwent material failure.

5: When the test piece was broken by bending with both hands, it underwent material failure and less than 50% of the expanded beads existing in the broken surface of the test piece underwent material failure.

4: When the test piece was broken by bending with both hands, there occurred peeling at the interface between the expanded beads, and the test piece separated.

3: After the test piece was taken out of the closed vessel, and when it was pushed by fingers, the test piece was broken into individual expanded beads separating from each other.

2. When touched, the test piece was broken into individual expanded beads separating from each other.

1. In the closed vessel, the test piece was broken into individual expanded beads separating from each other.

In Comparative Examples 1 and 2, the evaluation was "4", and in Comparative Example 4, the evaluation was "2". Therefore, in these, the subsequent evaluation was not carried out.

(Bulk Density of Molded Article After Solvent Treatment)

The test piece immediately after the solvent treatment was left at 23° C. for 1 minute so as to evaporate the solvent, and from the outside dimension of the resultant sample, the bulk volume thereof was obtained. Next, the mass (g) of the sample piece was accurately weighed. The mass of the test piece was divided by the bulk volume, and through unit conversion, the bulk density (kg/m³) of the molded article of expanded beads after the solvent treatment was calculated.

(Bending Strength of Molded Article (After Solvent Treatment))

The bending strength of the molded article after the solvent treatment was measured according to the method described in JIS K7221-2 (1999). Specifically, the test piece after the solvent treatment was set in the apparatus in such a manner that the distance between the supporting points could be 60 mm and the radius of the tip of the supporting points of supporting the test piece could be 5 mm and in such a manner that the skin surface of the test piece could come in contact with the test piece holder. Using a digital force gauge (FGPX) manufactured by NIDEC-SHIMPO Corporation, the bending strength of the molded article after the solvent treatment was measured. The test speed was 10 mm/min.

(Bending Strength/Bulk Density of Molded Article (After Solvent Treatment))

The bending strength of the molded article after the solvent treatment was divided by the bulk density of the molded article after the solvent treatment, and the value was expressed as percentage.

(Bending Strength/Bulk Density Retention Ratio After Solvent Treatment)

The bending strength/bulk density of the molded article after the solvent treatment (BS2) was divided by the bending strength/bulk density of the molded article before the solvent treatment (BS1), and the value was expressed as percentage.

TABLE 3-1

|  |  |  |  | Example 1 | Example 2 | Example 3 | Example 4 |
|---|---|---|---|---|---|---|---|
| Resin Beads |  | Core Layer | Composition | Crystalline PLA 100% | Crystalline PLA 100% | Crystalline PLA 100% | Crystalline PLA 100% |
|  |  | Coating Layer | Abbreviate of Coating Resin | MB1 | MB2 | MB3 | MB4 |
|  |  |  | Composition, Weight Ratio (Note: A-PLA, amorphous PLA) | A-PLA/PE1 = 85/15 | A-PLA/PE1 = 95/5 | A-PLA/PE1 = 70/30 | A-PLA/PP1 = 90/10 |
|  |  |  | Core Layer/Coating Layer (weight ratio) | 95/5 | 95/5 | 95/5 | 95/5 |
|  |  |  | Weight of Resin Beads (mg) | 2 | 2 | 2 | 2 |
| Expanded Beads | Production Conditions |  | Retention Temperature (° C.) | 134.5 | 134.5 | 134.5 | 134.5 |
|  |  |  | Retention Time (min) | 15 | 15 | 15 | 15 |
|  |  |  | Inner Pressure of Closed Vessel (MPa(G)) | 3.5 | 3.5 | 3.5 | 3.5 |
|  |  |  | Foaming Temperature (° C.) | 134.5 | 134.5 | 134.5 | 134.5 |
|  | Physical Properties |  | [(Bf: endo)-(Bf: exo)] (J/g) | 10 | 10 | 11 | 9 |
|  |  |  | Apparent Density (g/L) | 96 | 100 | 90 | 96 |
|  |  |  | Closed cell content (%) | 95 | 95 | 95 | 95 |
|  |  |  | Average cell Diameter (μm) | 98 | 85 | 89 | 78 |
|  |  |  | Coating Layer Peeling | no | no | no | no |
| Molded Article |  |  | Molding Pressure (MPa(G)) | 0.14 | 0.14 | 0.10 | 0.12 |
|  | Before Solvent Treatment |  | [(Bf: endo)-(Bf: exo)] (J/g) | 27 | 28 | 30 | 26 |
|  |  |  | Fusion-bonding Ratio (%) | 95 | 95 | 95 | 90 |
|  |  |  | Bulk Density (kg/m³) | 66 | 69 | 63 | 67 |
|  |  |  | Bending Strength (kPa) | 940 | 1100 | 950 | 990 |
|  |  |  | Bending deflection Amount (mm) | 7.3 | 7.0 | 8.0 | 7.5 |
|  |  |  | Bending Strength/Bulk Density (kPa · m³/kg): BS1 | 14.2 | 15.8 | 15.2 | 14.9 |
|  |  |  | Bending deflection Amount/Bulk Density (mm · m³/kg) | 0.110 | 0.101 | 0.128 | 0.113 |
|  | After Solvent Treatment |  | Evaluation of Fusion-bonding Condition after Solvent Treatment | 6 | 5 | 6 | 5 |
|  |  |  | Bulk Density (kg/m³) | 86 | 90 | 81 | 87 |
|  |  |  | Bending Strength (kPa) | 450 | 500 | 430 | 410 |
|  |  |  | Bending Strength/Bulk Density (kPa · m³/kg): BS2 | 5.2 | 5.5 | 5.3 | 4.7 |
|  |  |  | (Bending Strength/Bulk Density) Retention Ratio after Solvent Treatment (%) BS2/BS1 | 36.8 | 35.0 | 34.8 | 31.9 |

|  |  |  |  | Example 5 | Example 6 | Example 7 |
|---|---|---|---|---|---|---|
| Resin Beads |  | Core Layer | Composition | Crystalline PLA 100% | Crystalline PLA 100% | Crystalline PLA 100% |
|  |  | Coating Layer | Abbreviate of Coating Resin | MB1 | MB 5 | MB6 |
|  |  |  | Composition, Weight Ratio (Note: A-PLA, amorphous PLA) | A-PLA/PE1 = 85/15 | A-PLA/PE1 = 60/40 | A-PLA/PE2 = 85/15 |
|  |  |  | Core Layer/Coating Layer (weight ratio) | 90/10 | 95/5 | 95/5 |
|  |  |  | Weight of Resin Beads (mg) | 2 | 2 | 2 |
| Expanded Beads | Production Conditions |  | Retention Temperature (° C.) | 134.5 | 134.5 | 134.5 |
|  |  |  | Retention Time (min) | 15 | 15 | 15 |
|  |  |  | Inner Pressure of Closed Vessel (MPa(G)) | 3.5 | 3.5 | 3.5 |
|  |  |  | Foaming Temperature (° C.) | 134.5 | 134.5 | 134.5 |
|  | Physical Properties |  | [(Bf: endo)-(Bf: exo)] (J/g) | 10 | 11 | 10 |
|  |  |  | Apparent Density (g/L) | 99 | 93 | 96 |
|  |  |  | Closed cell content (%) | 95 | 95 | 95 |
|  |  |  | Average cell Diameter (μm) | 96 | 86 | 89 |
|  |  |  | Coating Layer Peeling | no | no | no |
| Molded Article |  |  | Molding Pressure (MPa(G)) | 0.14 | 0.10 | 0.12 |
|  | Before Solvent Treatment |  | [(Bf: endo)-(Bf: exo)] (J/g) | 28 | 30 | 29 |
|  |  |  | Fusion-bonding Ratio (%) | 95 | 95 | 95 |
|  |  |  | Bulk Density (kg/m³) | 69 | 65 | 67 |
|  |  |  | Bending Strength (kPa) | 1100 | 860 | 980 |
|  |  |  | Bending deflection Amount (mm) | 7.2 | 6.8 | 8.9 |
|  |  |  | Bending Strength/Bulk Density (kPa · m³/kg): BS1 | 16.0 | 13.2 | 14.7 |
|  |  |  | Bending deflection Amount/Bulk Density (mm · m³/kg) | 0.105 | 0.105 | 0.134 |
|  | After Solvent Treatment |  | Evaluation of Fusion-bonding Condition after Solvent Treatment | 6 | 6 | 5 |
|  |  |  | Bulk Density (kg/m³) | 89 | 85 | 87 |
|  |  |  | Bending Strength (kPa) | 450 | 280 | 450 |
|  |  |  | Bending Strength/Bulk Density (kPa · m³/kg): BS2 | 5.0 | 3.3 | 5.2 |
|  |  |  | (Bending Strength/Bulk Density) Retention Ratio after Solvent Treatment (%) BS2/BS1 | 31.5 | 25.0 | 35.3 |

TABLE 3-2

|  |  |  | Comparative Example 1 | Comparative Example 2 | Comparative Example 3 | Comparative Example 4 |
|---|---|---|---|---|---|---|
| Resin Beads |  | Core Layer Composition | Crystalline PLA 100% | Crystalline PLA 100% | Crystalline PLA 100% | Crystalline PLA 100% |
|  |  | Coating Layer Abbreviate of Coating Resin | MB7 | MB8 | MB9 | MB10 |
|  |  | Composition, Weight Ratio (Note: A-PLA, amorphous PLA) | A-PLA 100% | A-PLA/PE1 = 98/2 | A-PLA/PE1 = 50/50 | A-PLA/PE1 = 40/60 |
|  |  | Core Layer/Coating Layer (weight ratio) | 95/5 | 95/5 | 95/5 | 95/5 |
|  |  | Weight of Resin Beads (mg) | 2 | 2 | 2 | 2 |
| Expanded Beads | Production Conditions | Retention Temperature (° C.) | 134.5 | 134.5 | 134.5 | 134.5 |
|  |  | Retention Time (min) | 15 | 15 | 15 | 15 |
|  |  | Inner Pressure of Closed Vessel (MPa(G)) | 3.5 | 3.5 | 3.5 | 3.5 |
|  |  | Foaming Temperature (° C.) | 134.5 | 134.5 | 134.5 | 134.5 |
|  | Physical Properties | [(Bf: endo)-(Bf: exo)] (J/g) | 11 | 12 | 10 | 12 |
|  |  | Apparent Density (g/L) | 101 | 93 | 90 | 94 |
|  |  | Closed cell content (%) | 95 | 95 | 95 | 95 |
|  |  | Average cell Diameter (μm) | 101 | 86 | 88 | 79 |
|  |  | Coating Layer Peeling | no | no | no | yes |
| Molded Article |  | Molding Pressure (MPa(G)) | 0.12 | 0.10 | 0.12 | 0.12 |
|  | Before Solvent Treatment | [(Bf: endo)-(Bf: exo)] (J/g) | 29 | 32 | 27 | 31 |
|  |  | Fusion-bonding Ratio (%) | 90 | 90 | 95 | 95 |
|  |  | Bulk Density (kg/m³) | 70 | 65 | 63 | 65 |
|  |  | Bending Strength (kPa) | 1100 | 1000 | 800 | 780 |
|  |  | Bending deflection Amount (mm) | 4.8 | 5.2 | 6.0 | 5.8 |
|  |  | Bending Strength/Bulk Density (kPa · m³/kg): BS1 | 15.7 | 15.5 | 12.8 | 11.9 |
|  |  | Bending deflection Amount/Bulk Density (mm · m³/kg) | 0.068 | 0.081 | 0.096 | 0.089 |
|  | After Solvent Treatment | Evaluation of Fusion-bonding Condition after Solvent Treatment | 4 | 4 | 6 | 2 |
|  |  | Bulk Density (kg/m³) | — | — | 81 | — |
|  |  | Bending Strength (kPa) | — | — | 130 | — |
|  |  | Bending Strength/Bulk Density (kPa · m³/kg): BS2 | — | — | 1.6 | — |
|  |  | (Bending Strength/Bulk Density) Retention Ratio after Solvent Treatment (%) BS2/BS1 | — | — | 12.5 | — |

In the expanded beads each is composed of an expanded core layer containing a crystalline polylactic acid resin and a coating layer coating the core layer and containing a mixed resin of an amorphous polylactic acid resin and a crystalline polyolefin resin in Examples 1 to 7 of the present invention, the blend ratio of the amorphous polylactic acid resin and the crystalline polyolefin resin in the coating layer was varied. The fusion-bonding condition of the molded article after treatment with a solvent (styrene) and the "bending strength/bulk density" retention ratio [(BS2/BS1)×100(%)] thereof after the solvent treatment were evaluated. As shown in Table 3-1, the evaluation of the fusion-bonding condition of the molded article after the solvent treatment was "6" or "5" in every case. When the test piece after the solvent treatment was broken by bending it with both hands, the molded article underwent material failure, and 50% or more, or less than 50% of the expanded beads existing in the broken surface of the test piece underwent material failure. In addition, the "bending strength/bulk density" retention ratio after the solvent treatment was 25.0 to 36.8%, and as compared with that in Comparative Examples, the retention ratio was high.

On the other hand, Examples were compared with Comparative Example 1 where the blend ratio of the amorphous polylactic acid and the crystalline resin in the coating layer was 100/0, Comparative Example 2 where the ratio was 98/2, the Comparative Example 3 where the ratio was 50/50, and Comparative Example 4 where the ratio was 40/60. As shown in Table 3-2, in Comparative Example 1 where the blend ratio of the crystalline polyolefin ratio was 0, and in Comparative Example 2 where the ratio was 2% by weight, peeling occurred at the interface between the expanded beads each other when the test piece after the solvent treatment was bent with both hands and the test piece separated, or that is, the evaluation of the fusion-bonding condition of the molded article after the solvent treatment was "4" and the solvent resistance thereof was poor. On the other hand, in Comparative Example 3 where the blend ratio in the coating layer was 50/50, the evaluation of the fusion-bonding condition in the molded article after the solvent treatment was "6", but the bending strength after the solvent treatment lowered and the retention ratio thereof was 12.5%.

In Comparative Example 4 where the blend ratio in the coating layer was 40/60, that is, the coating layer was rich in the crystalline polyolefin resin (polyethylene), the evaluation of the fusion-bonding condition in the molded article after the solvent treatment was "2", that is, the test piece after the solvent treatment broke into individual expanded beads when touched. This is because the coating layer itself peeled from the core layer in the expanded beads.

INDUSTRIAL APPLICABILITY

The expanded polylactic acid resin beads of the present invention are multilayer expanded beads, in which each bead is composed of an expanded polylactic acid resin core layer and a coating layer that coats the expanded core layer, wherein the coating layer is formed with a specific resin composition of raw materials. The expanded polylactic acid resin beads are effectively used as those excellent in solvent resistance and fusion-bonding between the expanded beads therein.

The molded article of expanded polylactic acid resin beads of the present invention produced by in-mold molding the expanded polylactic acid resin beads of the present invention has solvent resistance. Accordingly, when this is compounded with a thermosetting resin as a reinforcing member such as a core material or the like, it is hard to infiltrate by the solvent such as styrene or the like that is contained in the thermosetting resin composition, and therefore can exhibits a function as a reinforcing member such as a core material or the like. Consequently, the molded article can be effectively used for an FRP composite molded article.

The invention claimed is:

1. Expanded polylactic acid resin beads, wherein:
the expanded bead is composed of a core layer that is in an expanded state and consists of a crystalline polylactic acid resin, and a coating layer that coats the core layer and contains a mixed resin of an amorphous polylactic acid resin and a crystalline polyolefin resin, and
the content of the crystalline polyolefin resin in the coating layer is 5% by weight or more and 30% by weight or less relative to the total amount, 100% by weight of the resins constituting the coating layer,
wherein an endothermic calorific value (Br; endo) of the crystalline polylactic acid resin in the core layer is 20 to 70 J/g when being measured according to JIS K 7121(1987), wherein a melting point of the crystalline polyolefin resin of the coating layer is 100° C. to 130° C. when measured according to JIS K 7121 (1987),
wherein the melting point of the crystalline polyolefin resin is lower than the melting point of the crystalline polylactic acid resin by 20° C. to 60° C.,
wherein the core layer and the coating layer are adhered to each other and a ratio by weight of the core layer to the coating layer is about 95/5 to 97/3,
wherein the content of other resins besides the amorphous polylactic acid resin and the crystalline polyolefin resin is 0% by weight relative to the total amount by weight of the resins constituting the coating layer, and
wherein the crystalline polyolefin resin is a linear low-density polyethylene resin.

2. The expanded polylactic acid resin beads according to claim 1, wherein the content of the crystalline polyolefin resin in the coating layer is 10% by weight or more to 30% by weight or less relative to the total amount by weight of the resins constituting the coating layer.

3. The expanded polylactic acid resin beads according to claim 1, wherein the melting point of the crystalline polyolefin resin is lower than the melting point of the crystalline polylactic acid resin by 40° C. to 60° C.

4. A molded article of expanded polylactic acid resin beads, which is produced by molding the expanded polylactic acid resin beads according to claim 1 in a mold cavity.

5. The molded article of the expanded polylactic acid resin beads according to claim 4, wherein the bulk density of the molded article of the expanded polylactic acid resin beads is 15 to 300 kg/m3, and the ratio of a bending strength (kPa) of the molded article of the expanded polylactic acid resin beads to the bulk density (kg/m3) thereof (bending strength/bulk density) is 13 or more (kPa·m3/kg).

6. The molded article of the expanded polylactic acid resin beads according to claim 4, which is to be used for an FRP composite molded article.

7. The molded article of the expanded polylactic acid resin beads according to claim 4, wherein the ratio of the bending strength/bulk density after solvent treatment in styrene for 1 hour is 5.2-5.5 (kPa. M3/kg) where the bending strength is determined as described in JIS K7221-2 (1999).

8. The molded article of the expanded polylactic acid resin beads according to claim 7, wherein the bending strength/bulk density retention ratio after solvent treatment (BS2) divided by the bending strength/bulk density of the molded article before the solvent treatment (BS1), expressed as (BS2)/(BS1), is 34.8-36.8%.

* * * * *